United States Patent
Bilange

(10) Patent No.: US 9,203,891 B2
(45) Date of Patent: Dec. 1, 2015

(54) SYSTEM AND METHOD TO ENABLE WEB PROPERTY ACCESS TO A NATIVE APPLICATION

(71) Applicant: QUALCOMM Incorporated, San Diego, CA (US)

(72) Inventor: Eric P Bilange, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 174 days.

(21) Appl. No.: 13/798,703

(22) Filed: Mar. 13, 2013

(65) Prior Publication Data

US 2014/0280694 A1 Sep. 18, 2014

(51) Int. Cl.
*H04L 29/08* (2006.01)
*G06F 9/445* (2006.01)
*G06F 9/54* (2006.01)

(52) U.S. Cl.
CPC .............. *H04L 67/02* (2013.01); *G06F 9/4451* (2013.01); *G06F 9/54* (2013.01)

(58) Field of Classification Search
CPC ..................................................... H04L 67/02
USPC ........... 709/217, 219, 220; 707/609, 621, 758
See application file for complete search history.

(56) References Cited

U.S. PATENT DOCUMENTS

| | | | |
|---|---|---|---|
| 5,752,042 A | 5/1998 | Cole et al. | |
| 7,437,312 B2 | 10/2008 | Bhatia et al. | |
| 7,558,748 B2 | 7/2009 | Ehring et al. | |
| 7,962,444 B2 * | 6/2011 | Maciocci | G06F 17/30899 455/456.6 |
| 2003/0050964 A1 | 3/2003 | Debaty et al. | |
| 2004/0221021 A1 | 11/2004 | Domer | |
| 2008/0189360 A1 | 8/2008 | Kiley et al. | |
| 2010/0229045 A1 | 9/2010 | Schultz et al. | |
| 2011/0055314 A1 | 3/2011 | Rosenstein et al. | |
| 2011/0213655 A1 | 9/2011 | Henkin et al. | |
| 2011/0287710 A1 * | 11/2011 | Kjellberg | H04W 76/002 455/3.01 |
| 2012/0159357 A1 | 6/2012 | Lim et al. | |
| 2012/0317261 A1 * | 12/2012 | Ahmavaara | 709/223 |

FOREIGN PATENT DOCUMENTS

| WO | 2010054235 A2 | 5/2010 |
|---|---|---|
| WO | 2012031756 A1 | 3/2012 |

OTHER PUBLICATIONS

"Mobile Web Apps vs. Mobile Native Apps: How to Make the Right Choice"—Lionbridge, Jun. 2012 http://www.lionbridge.com/files/2012/11/Lionbridge-WP_MobileApps2.pdf.*
International Search Report and Written Opinion—PCT/US2014/022250—ISA/EPO—Jul. 3, 2014.

* cited by examiner

*Primary Examiner* — Randy Scott
(74) *Attorney, Agent, or Firm* — Smith Risley Tempel Santos LLC

(57) ABSTRACT

A method for allowing a web property access to a native application includes providing a native application on a wireless device, sending a request for content, receiving content, the content including executable code, running the executable code to access contextual information related to the wireless device, sending the contextual information, and receiving contextual content in the wireless device based on the contextual information.

17 Claims, 6 Drawing Sheets

SYSTEM AND METHOD TO ENABLE WEB PROPERTY ACCESS TO A NATIVE APPLICATION

DESCRIPTION OF THE RELATED ART

Information in the form of content from websites is typically provided to many different types of devices and users. One type of device and user that is increasingly receiving more and more web content is a wireless device and a mobile user. A wireless device can be a portable computing device, a tablet computer, a smart phone, or any other portable, or wireless device that is capable of browsing and receiving web content.

A web browser on a mobile wireless computing device provides the primary way to accesses information online. Some users may install one or more applications on a wireless device, but for the majority of users, accessing online content is typically done using a web browser that is native to the device, or one that is downloaded to the device. Web browsers comply with W3C (World Wide Web consortium) specifications and some web browsers may include additional capabilities. However, web browsers do not fully bridge a native application program interface (API) of the device on which they are installed, and therefore, web applications are limited in functionality compared to native applications.

One of the capabilities that has not been widely exploited by most web applications operating in accordance with HTML 5 is the ability to enable executable code (i.e., Javascript code) to access an application on the same platform that the browser is running on by using a web socket interface. For example, if it is desirable for a web application to adapt its behavior based on the location of the user that is accessing the web application relative to the user's day-to-day life (such as the location of the user; e.g., at home, at work, at the gym, at school, etc.) it would require the ability to actively monitor the user's location and construct a history or database of these locations over time. However, this is not possible with existing web browsers because user location can be accessed only during active web browsing and the concept of "active monitoring" cannot be implemented by Javascript code working in the background of a web browser under HTML 5 due to application and browser life-cycle limitations. For example, an HTML 5 application may not control the life-cycle of one of its workers, it may be shut down any time by the browser in case of resource conflicts. The term "worker" refers to JavaScript in HTML 5 that can be executed in its own thread as a background process. Therefore, a web site cannot adapt its content delivery from non-trivial contextual information related to a user of a device accessing the web site using information that can be aggregated over time as a user carries and uses a device.

Some large-scale websites, such as Yahoo (www.yahoo.com) for example only, have the ability to encourage their users to download a native application to optimize the user's experience at that web site. Unfortunately, these web sites generally offer very specific services such as email, news, instant messaging and yet they still have web properties (other web sites under the same domain as the subject web site) that are not captured in the native application.

Therefore, it would be desirable to allow a web property to access user specific and personal information while users are browsing on their sites to provide the user an enriched experience.

SUMMARY

An embodiment of a method for allowing a web property access to a native application includes providing a native application on a wireless device, sending a request for content, receiving content, the content including executable code, running the executable code to access contextual information related to the wireless device, sending the contextual information, and receiving contextual content in the wireless device based on the contextual information.

An embodiment of a wireless device includes a native application, a web browser configured to send a request for content and receive the content, the content comprising executable code, and a processor configured to run the executable code to access contextual information located on the wireless device. The web browser is configured to send the contextual information and the wireless device is configured to receive contextual content based on the contextual information.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
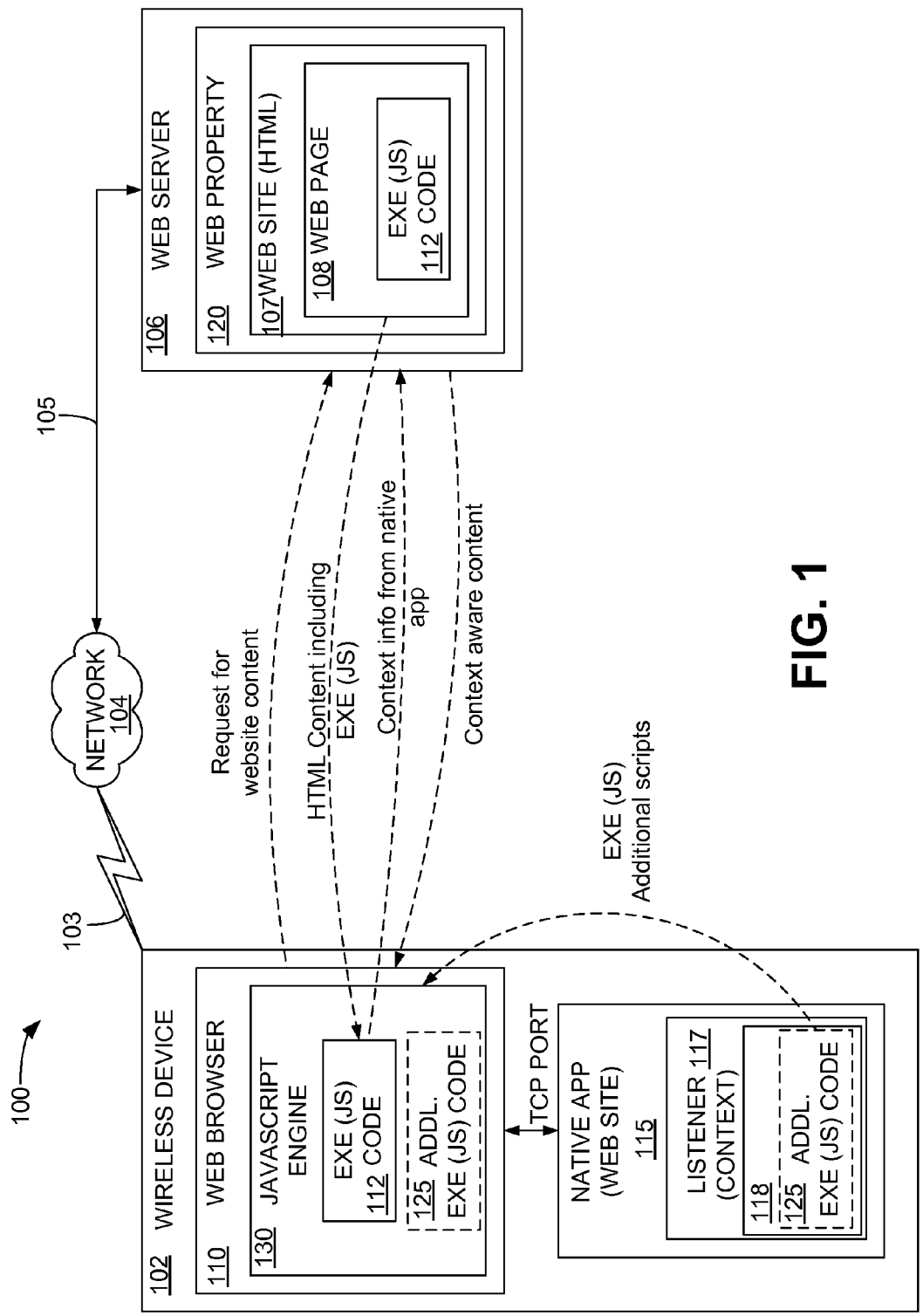
FIG. 1 is a functional block diagram illustrating an embodiment of a system to enable a web property to access a native application.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the term "user device" includes a device capable of receiving content from a web site and transmitting information to a website. A user device can be a stationary device, a wireless device or a mobile device.

As used herein, the term "wireless device" refers to any portable or wireless computing device that is capable of accessing a web property or a web site. As used herein, the term "user device" is interchangeable with the term "wireless device."

As used herein, the term "user" refers to an individual receiving content on a user device or a wireless device and transmitting information to a website.

As used herein, the term "context" refers to any or all attributes of the user, the user device, or the wireless device, such as physical, logical, social and other contextual information.

As used herein, the terms "context aware metadata" and "contextual metadata" refer to metadata that describes or defines the context of a user, a user device or a wireless device.

As used herein, the term "context aware content" refers to content that is delivered to a user device or a wireless device and that is tailored to a user's context.

As used herein, the term "web property" refers to an entity having one or more websites having one or more web pages.

In an embodiment, a system and method to enable web property access to a native application comprises enabling the native application to embed a system, such as a context awareness application, and enable local (to the wireless device in which the native application is downloaded) web socket interaction so that web properties specific to the developer of the native application (e.g., Yahoo) can benefit from native functions. For example, if Yahoo embeds a context awareness application in their native application and the context awareness application opens a local connection on the wireless device to allow a Yahoo property (web site) to access it, then if Yahoo's web properties embed an executable code, such as a JavaScript code, to communicate (e.g., via a web socket connection) with the wireless device, and if a user of the wireless device has installed Yahoo's native application (that embeds the context awareness application) then Yahoo's web properties can access the user's contextual data from the user's wireless device. The user's contextual data is made available by the context awareness application to a web property to allow the web property to provide context aware content to the wireless device. Using Yahoo as an example, this would allow Yahoo to display contextual ads on all of their web sites when accessed from a wireless device after the user of the wireless device has downloaded and launched the native Yahoo application.

FIG. 1 is a functional block diagram illustrating an embodiment of a system to enable a web property to access a native application. The system 100 comprises a wireless device 102 that is connected to a web server 106 over a network 104. The wireless device 102 can be any mobile computing device, such as a cellular telephone, a tablet computing device, or any other wireless device capable of accessing the World Wide Web and can be connected to the network 104 over a communication channel 103. Although depicted as a wireless communication channel, the communication channel 103 can be any communication channel. The web server 106 can be connected to the network 104 over a communication channel 105. Although depicted as a wired communication channel, the communication channel 105 can be any communication channel. The web server 106 can be a hypertext transfer protocol (HTTP) server capable of providing content from a web property 120 to the wireless device 102 over the network 104. In an embodiment, the web server 106 maintains and can deliver content from one or more web sites 107 in the form of one or more web pages 108. It is understood that the web page 108 can include various web-based content, including HTML content, and that although a single web page 108 is illustrated, it is understood that a web property 120 can comprise multiple web sites 107 having multiple web pages 108. The network 104 can be any wide area or local area network, and, in an embodiment, can be the World Wide Web.

The wireless device 102 is shown in FIG. 1 as a highly simplified wireless device capable of accessing the World Wide Web. Those having ordinary skill in the art will understand that the wireless device 102 comprises many additional components that are omitted from FIG. 1 for simplicity. The wireless device 102 comprises a web browser 110 and a native application 115.

As an example, the native application 115 may be an application provided by the web property 120 or by the web site 107 and downloaded to, or otherwise installed in, the wireless device 102. As an example, the native application 115 may be downloaded to the wireless device 102 from the web server 106. The native application 115 may be an application provided by, linked to, or otherwise associated with the web property 120 or the web site 107. As an example, the web site 107 may provide the native application 115 to the wireless device 102 as a way of providing an enriched or improved user experience to the user of the wireless device 102 when the web browser 110 is used to access a web property 120, a web site 107 or a web page 108 that is maintained by the web property 120.

In an embodiment, the native application 115 may include an application program 117. In an embodiment, the application program 117 can be a context awareness module or application, or any module or application that can gather and maintain contextual information relating to the wireless device 102 and/or relating to a user of the wireless device 102. In this regard, the application program 117 can be referred to as a "listener" application or a "context" application in that it can access contextual information related to the wireless device 102. In an alternative implementation, the native application 115 may include a separate or integrated module that provides functionality that can gather, maintain and access contextual information relating to the wireless device 102, without using a separate application program 117. However, in an embodiment described herein, the application program 117 can be a context awareness application that is included in or otherwise associated with the native application 115 and will be referred to as a context application program 117. The context application program 117 can gather, maintain and access contextual information related to the wireless device 102 and/or the user of the wireless device 102. The term "contextual information" refers to any information relating to the user profile, user browsing habits, user location, or any other contextual information related to the user of the wireless device 102.

The web site 107 or web page 108 may also transfer to the wireless device 102 executable code 112. In an embodiment, the executable code 112 can be Javascript code; however, other executable code is possible. In an embodiment, the executable code 112 is provided to the web browser 110 along with the HTML content provided by the web site 107 when the web browser 110 accesses the web page 108. The web browser 110 also comprises a Javascript engine 130. The Javascript engine 130 is configured to execute the executable code 112, such as Javascript code. In an embodiment, the executable code 112 is executed by the Javascript engine 130 on the web browser 110 and allows the web browser 110 to interact with the native application 115 by requesting that the native application 115 open a TCP (transmission control protocol) port against the native application 115. In an embodiment, the Javascript engine 130 on the web browser 110 runs the executable code 112 and allows the native application 115 to have a web socket connection opened to the context application program 117 on the wireless device 102 to access data contained in the context application program 117 on the wireless device 102. In an embodiment, the data accessed by the native application 115 pertains to the contextual information maintained by the context application program 117, or otherwise maintained by the native application 115.

In an alternative embodiment, the execution of the executable code 112 will cause the Javascript engine 130 to download a page 118 from the context application program 117, the page 118 containing additional executable code 125. Such an implementation may be useful in preventing security breaches related to cross-site scripting (XSS), which can compromise the security of the wireless device 102. In such an embodiment, the executable code 125 allows the web browser 110 to obtain the contextual information directly from the context application program 117 without exchanging scripts with the web property. In an embodiment, the executable code 112 can include instructions to allow the additional executable code 125 to be downloaded from the context application program 117.

Figure 2:
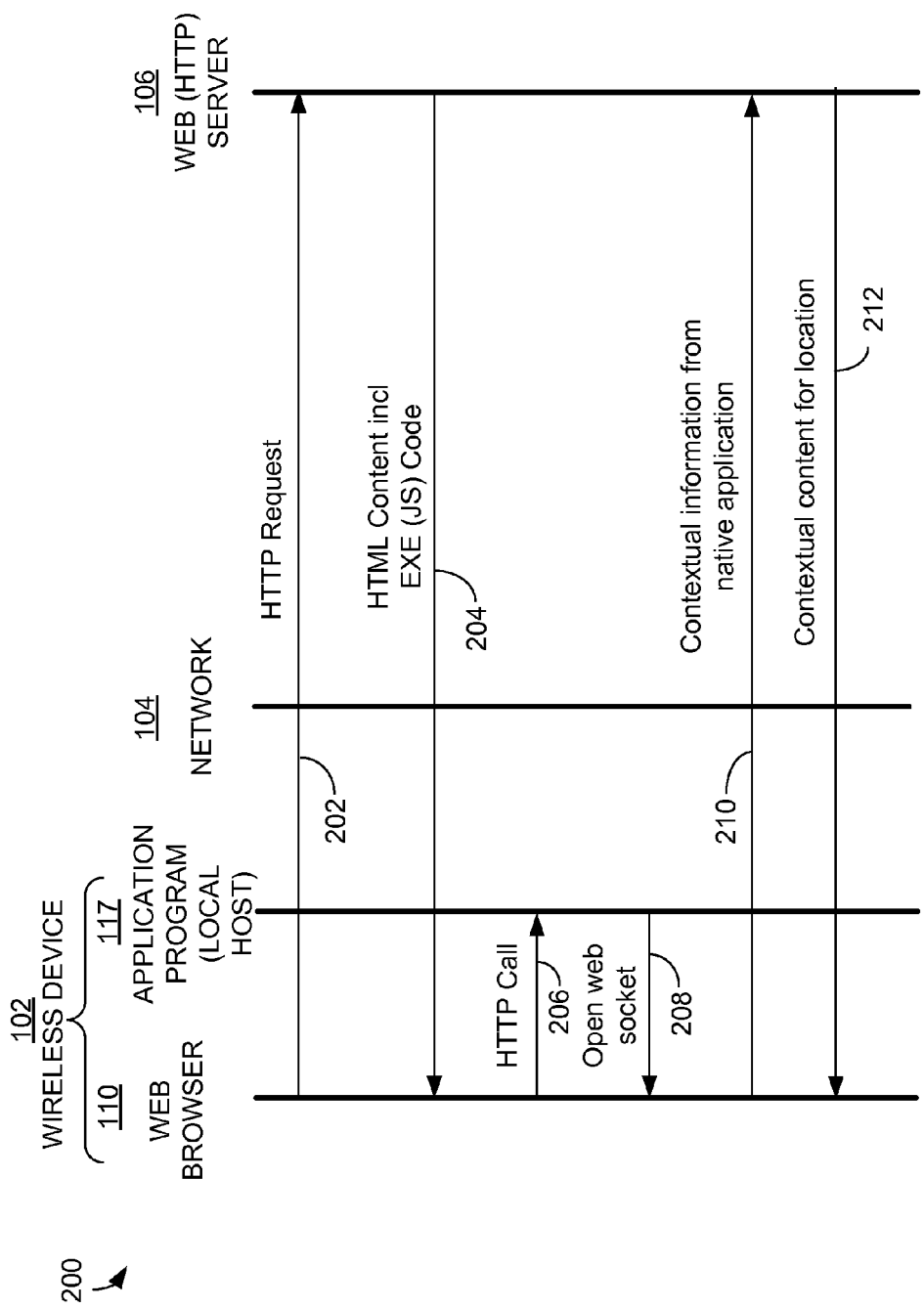
FIG. 2 is a call flow diagram illustrating an embodiment of a method to enable web property access to a native application.

FIG. 2 is a call flow diagram 200 illustrating an embodiment of a method to enable web property access to a native application. The diagram 200 illustrates the operation of various elements in FIG. 1 for reference. As an example, call 202 represents a web browser 110 on the wireless device 102 sending an HTTP request for a web page 108 to the web server 106.

The call 204 represents the web server 106 sending HTML content including executable code 112 to the web browser 110 on the wireless device 102. In an embodiment, the executable code 112 included with the HTML content is JavaScript code. The executable code 112 is executed by the JavaScript engine 130 on the wireless device 102.

The call 206 represents an HTTP call made from the web browser 110 to the context application program 117 (also referred to as a "local host") on the wireless device 102. The call 206 represents the execution of the executable code 112 causing the web browser 110 to request that the native application 115 open a web socket connection to a TCP (transmission control protocol) port against the native application 115 on the wireless device 102 to allow the web browser 110 to access contextual data contained in the context application program 117.

The call 208 represents the native application 115 opening a web socket connection to the browser 110 on the wireless device 102.

The call 210 represents the web browser 110 on the wireless device 102 running the executable code 112 and represents the web browser 110 requesting that the native application 115 open a web socket connection to a TCP port against the native application 115 on the wireless device 102 to allow the web browser 110 to access contextual data contained in the context application program 117. The contextual data is sent to the web server 106.

The call 212 represents the web server 106 serving contextual content to the wireless device 102 based on the contextual information received from the wireless device 102.

Figure 3:
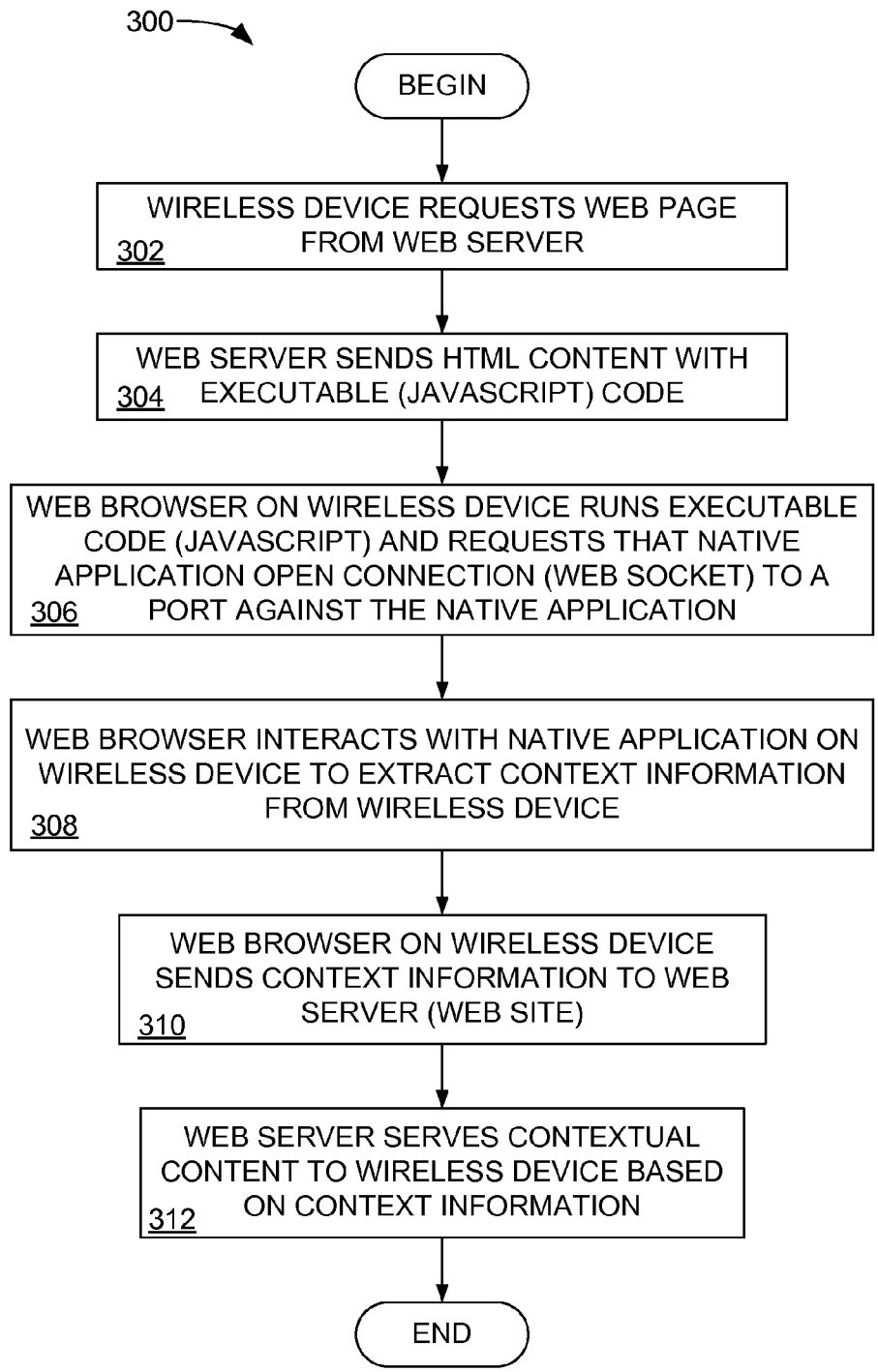
FIG. 3 is a flow chart describing an embodiment of a method for enabling web property access to a native application.

FIG. 3 is a flow chart describing an embodiment of a method for enabling web property access to a native application. In block 302, a wireless device 102 requests a web page 108 from the web server 106.

In block 304, the web server sends HTML content including executable code to the wireless device 102. In an embodiment, the HTML content includes JavaScript code 112.

In block 306, the web browser 110 on the wireless device 102 runs the executable code 112 and requests that the native application 115 open a web socket connection to a TCP port against the native application 115 to allow the web browser 110 to access contextual content data contained in or accessible by the context application program 117 on the wireless device 102.

In block 308, the web browser interacts with the native application 115 to extract contextual information from the context application program 117 on the wireless device 102. In an embodiment, the native application 115 can include what is referred to as a "listener" function that is always running on and accumulating profile, history, and other real-time data related to the wireless device 102.

In block 310, the web browser 110 on the wireless device 102 sends contextual information to the web server 106 and the web site 108.

In block 312, the web server 106 serves contextual content to the wireless device based on the contextual information relating to the wireless device 102.

Figure 4:
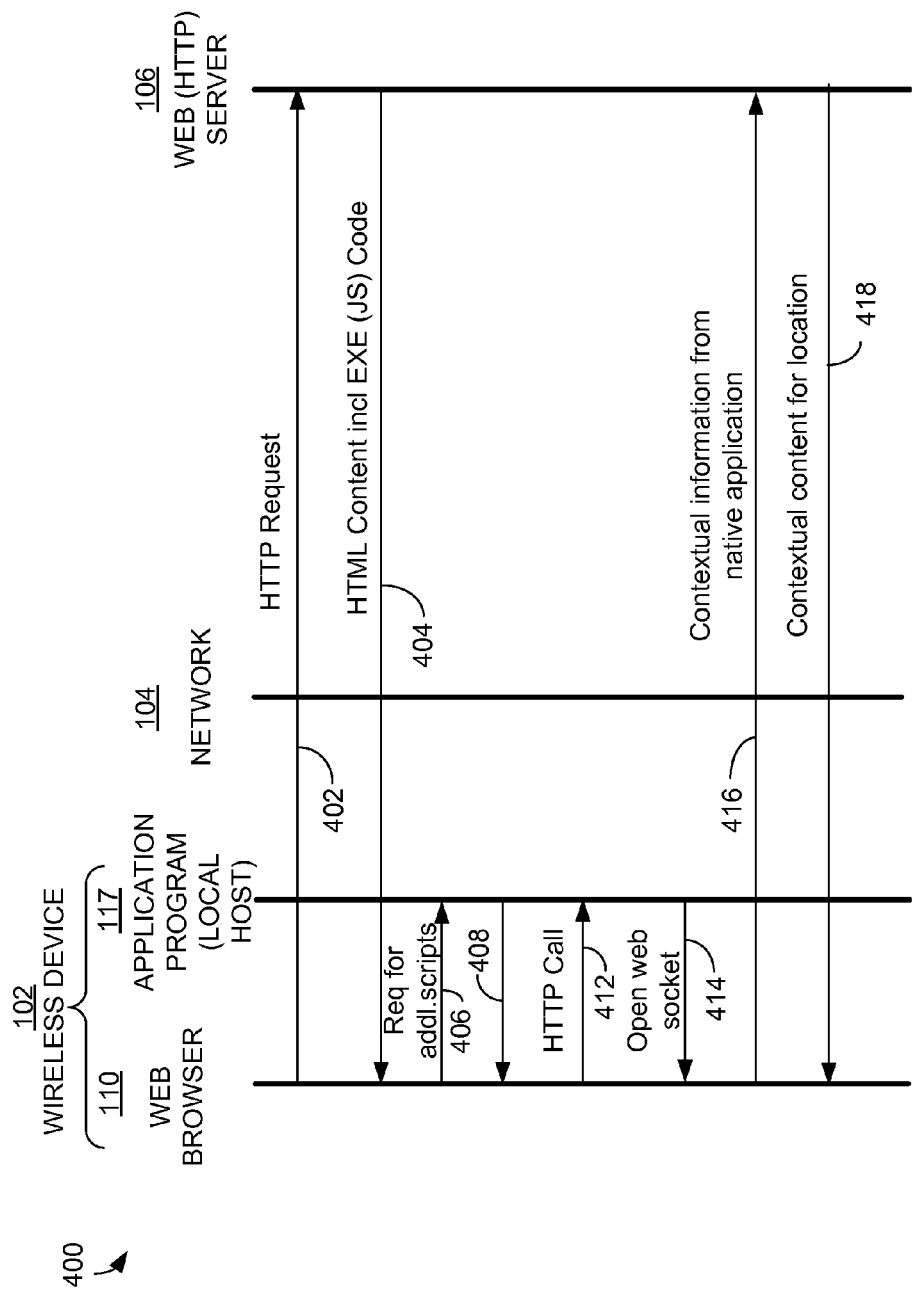
FIG. 4 is a call flow diagram illustrating an alternative embodiment of a method to enable web property access to a native application.

FIG. 4 is a call flow diagram 400 illustrating an alternative embodiment of a method to enable web property access to a native application. The diagram 400 illustrates the operation of various elements in FIG. 1 for reference and refers to an embodiment in which the additional executable code 125 (FIG. 1) is provided from the context application program 117 to the web browser 110 to allow the transfer of contextual information to the web browser 110 without exchanging scripts with the web property, thus minimizing the possibility of security breaches possible with cross-site scripting (XSS) where scripts are transferred between a wireless device and a web property.

As an example, call 402 represents a web browser 110 on the wireless device 102 sending an HTTP request for a web page 108 to the web server 106.

The call 404 represents the web server 106 sending HTML content including executable code 112 to the web browser 110 on the wireless device 102. In an embodiment, the executable code 112 included with the HTML content is JavaScript code. The executable code 112 is executed by the JavaScript engine 130 on the wireless device 102. In an embodiment, the executable code 112 can include instructions to allow additional executable code 125 to be downloaded from the context application program 117.

The call 406 represents a call made from the web browser 110 to the application program 117 (also referred to as a "local host") on the wireless device 102 requesting additional executable code in the form of additional scripts. In such an embodiment, the additional scripts can be in the form of executable code 125 that allows the web browser 110 to obtain the contextual information directly from the context application program 117 without exchanging scripts with the web property.

The call 408 represents the application program 117 responding to the web browser 110 with additional executable code 125 (FIG. 1) in the form of additional scripts that allow the web browser 110 and the context application program 117 to communicate while minimizing the possibility of security breaches possible with cross-site scripting (XSS).

The call 412 represents an HTTP call made from the web browser 110 to the application program 117 (also referred to as a "local host") on the wireless device 102. The call 412 represents the execution of the executable code 112 causing the web browser 110 to request that the native application 115 open a web socket connection to a TCP (transmission control protocol) port against the native application 115 on the wireless device 102 to allow the web browser 110 to access contextual data contained in the context application program 117.

The call 414 represents the native application 115 opening a web socket connection to the browser 110 on the wireless device 102.

The call 416 represents the web browser 110 on the wireless device 102 running the executable code 112 and the executable code 125 and represents the web browser 110 requesting that the native application 115 open a web socket connection to a TCP port against the native application 115 on the wireless device 102 to allow the browser 110 to access contextual data contained in the application program 117. The contextual data is sent to the web server 106.

The call 418 represents the web server 106 serving contextual content to the wireless device 102 based on the contextual information received from the wireless device 102.

Figure 5:
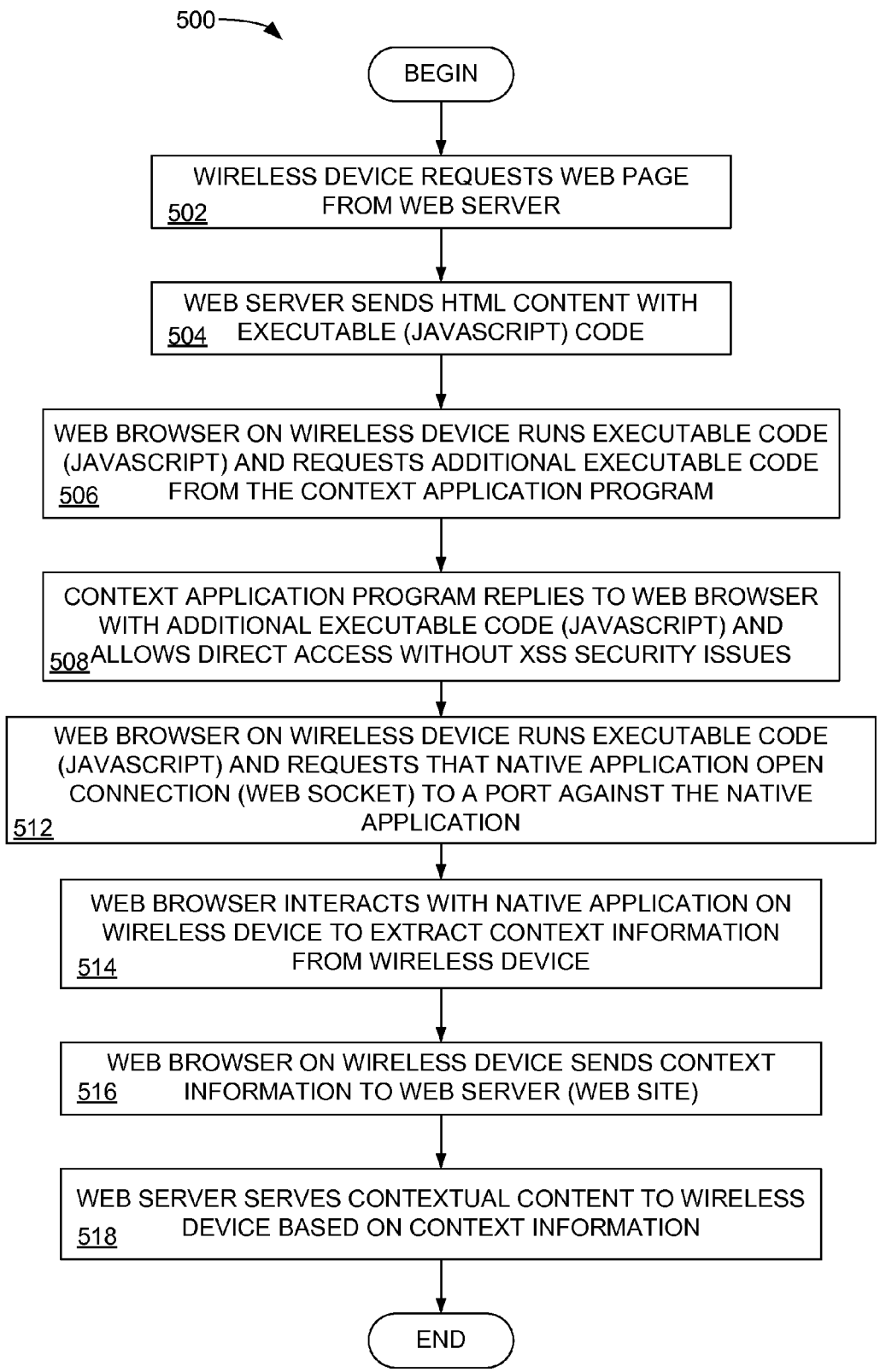
FIG. 5 is a flow chart describing an alternative embodiment of a method for enabling web property access to a native application.

FIG. 5 is a flow chart describing an alternative embodiment of a method for enabling web property access to a native application. In block 502, a wireless device 102 requests a web page 108 from the web server 106.

In block 504, the web server sends HTML content including executable code to the wireless device 102. In an embodiment, the HTML content includes JavaScript code 112.

In block 506, the web browser 110 runs the executable code and requests from the context application program 117 additional executable code in the form of additional scripts.

In block 508, the context application program 117 replies to the web browser 110 with a page 118 having additional executable code 125 (FIG. 1) in the form of additional scripts that allow the web browser 110 and the application program 117 to communicate while minimizing the possibility of security breaches possible with cross-site scripting (XSS).

In block 512, the web browser 110 on the wireless device 102 runs the executable code 112 and requests that the native application 115 open a web socket connection to a TCP port against the native application 115 to allow the web browser 110 to access contextual content data contained in the context application program 117 on the wireless device 102.

In block 514, the web browser 110 interacts with the native application 115 to extract contextual information from the application program 117 on the wireless device 102. In an embodiment, the native application 115 can include what is referred to as a "listener" function that is always running on and accumulating profile, history, and other real-time data related to the wireless device 102.

In block 516, the web browser 110 on the wireless device 102 sends contextual information to the web server 106 and the web site 108.

In block 518, the web server 106 serves contextual content to the wireless device based on the contextual information relating to the wireless device 102.

Figure 6:
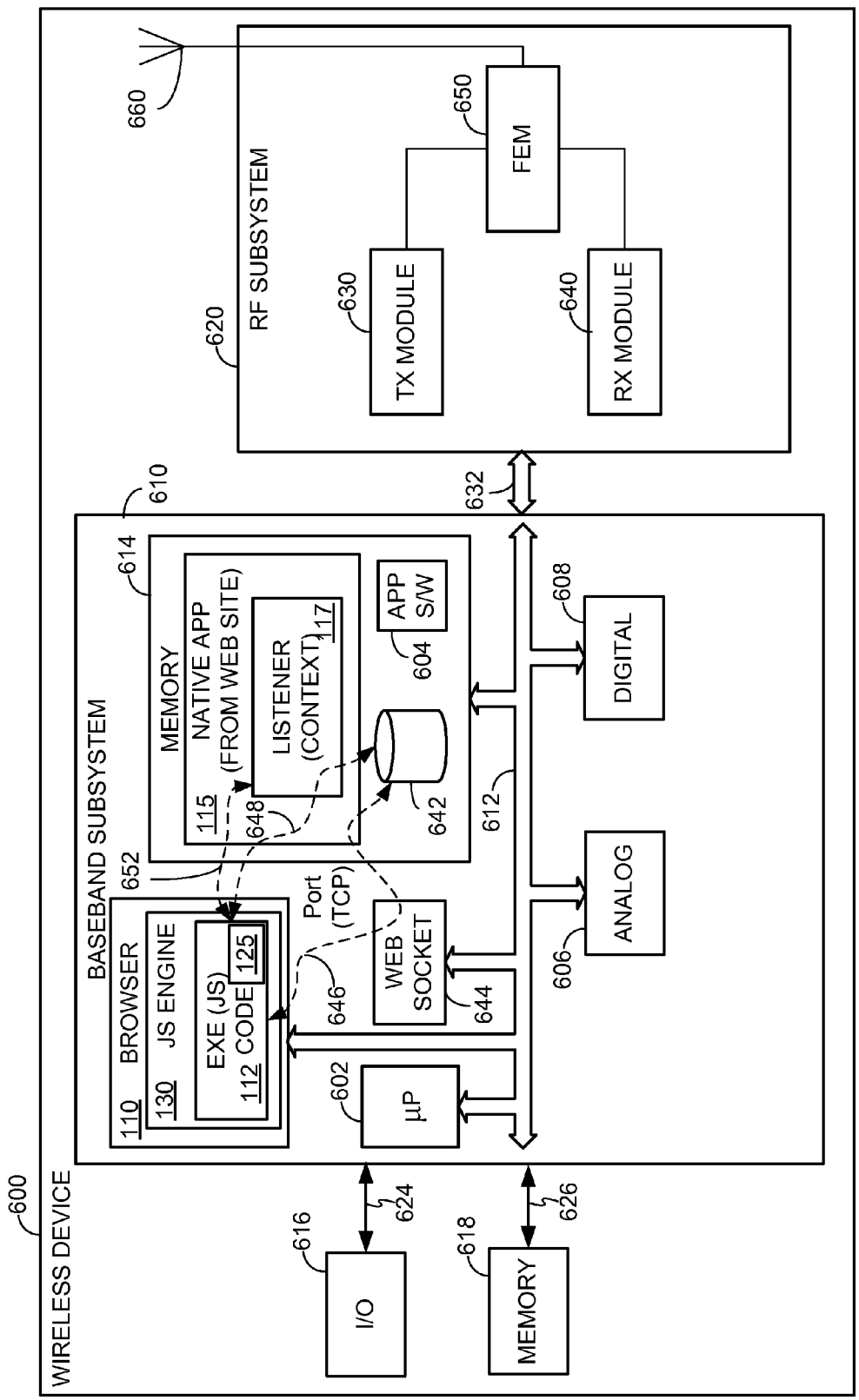
FIG. 6 is a block diagram illustrating an example of a wireless device in which the system and method for enabling web property access to a native application can be implemented.

FIG. 6 is a block diagram illustrating an example of a wireless device 600 in which the system and method for enabling web property access to a native application can be implemented. In an embodiment, the wireless device 600 can be a "Bluetooth" wireless communication device, a portable cellular telephone, a WiFi enabled communication device, or can be any other communication device. Embodiments of the system and method for enabling web property access to a native application can be implemented in any communication device. The wireless device 600 illustrated in FIG. 6 is intended to be a simplified example of a cellular telephone and to illustrate one of many possible applications in which the system and method for enabling web property access to a native application can be implemented. One having ordinary skill in the art will understand the operation of a portable cellular telephone, and, as such, implementation details are omitted. In an embodiment, the wireless device 600 includes a baseband subsystem 610 and an RF subsystem 620 connected together over a system bus 632. The system bus 632 can comprise physical and logical connections that couple the above-described elements together and enable their interoperability. In an embodiment, the RF subsystem 620 can be a wireless transceiver. Although details are not shown for clarity, the RF subsystem 620 generally includes a transmit module 630 having modulation, upconversion and amplification circuitry for preparing a baseband information signal for transmission, includes a receive module 640 having amplification, filtering and downconversion circuitry for receiving and downconverting an RF signal to a baseband information signal to recover data, and includes a front end module (FEM) 650 that includes diplexer circuitry, duplexer circuitry, or any other circuitry that can separate a transmit signal from a receive signal, as known to those skilled in the art. An antenna 660 is connected to the FEM 650.

The baseband subsystem 610 generally includes a processor 602, which can be a general purpose or special purpose microprocessor, memory 614, application software 604, analog circuit elements 606, and digital circuit elements 608, coupled over a system bus 612. The system bus 612 can comprise the physical and logical connections to couple the above-described elements together and enable their interoperability.

An input/output (I/O) element 616 is connected to the baseband subsystem 610 over connection 624 and a memory element 618 is coupled to the baseband subsystem 610 over connection 626. The I/O element 616 can include, for example, a microphone, a keypad, a speaker, a pointing device, user interface control elements, and any other devices or system that allow a user to provide input commands and receive outputs from the wireless device 600.

The memory 618 can be any type of volatile or non-volatile memory, and in an embodiment, can include flash memory. The memory 618 can be permanently installed in the wireless device 600, or can be a removable memory element, such as a removable memory card.

The processor 602 can be any processor that executes the application software 604 to control the operation and functionality of the wireless device 600. The memory 614 can be volatile or non-volatile memory, and in an embodiment, can be non-volatile memory that stores the application software 604.

The analog circuitry 606 and the digital circuitry 608 include the signal processing, signal conversion, and logic that convert an input signal provided by the I/O element 616 to an information signal that is to be transmitted. Similarly, the analog circuitry 606 and the digital circuitry 608 include the signal processing elements used to generate an information signal that contains recovered information from a received signal. The digital circuitry 608 can include, for example, a digital signal processor (DSP), a field programmable gate array (FPGA), or any other processing device. Because the baseband subsystem 610 includes both analog and digital elements, it can be referred to as a mixed signal device (MSD).

The baseband subsystem 610 also comprises an instance of the web browser 110, which includes an instance of the JavaScript engine 130 and the executable code 112. The memory 614 comprises a database 642 and an instance of the native application 115, which includes an instance of the context application program 117. In an example embodiment, the database 642 stores contextual data related to the wireless device 600 obtained from the context application program 117. In an embodiment of the system and method for enabling web property access to a native application, the JavaScript engine 130 on the web browser 110 runs the executable code 112 and requests that the native application 115 open a web socket connection 644 to a TCP port against the native application 115 to allow the web browser 110 to access contextual content data contained in the database 642. This interaction is illustrated in FIG. 6 using the arrow 646 and is illustrated as a direct connection between the context application program 117 and the Javascript engine 130 using arrow 652. The port can be a TCP port or other means to expose the native application 115 and the context application program 117 to the web browser 110 or other element on the wireless device 600. The executable code 112, or if included, the additional executable code 125, interacts with the native application 115 to extract contextual information obtained from the context application program 117 and stored in the database 642 without exchanging scripts with the web property. This interaction is illustrated in FIG. 6 using the arrow 648. In an embodiment, the native application 115 can include what is referred to as a "listener" function that is always running on and accumulating profile, history, and other real-time data related to the wireless device 600.

The web browser 110 on the wireless device 600 then sends the contextual information to the web server 106 and the web site 108, so that the web site 108 can provide contextual content to the wireless device 600 based on the contextual information.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for allowing a web property access to a native application, comprising:
   providing a native application on a wireless device;
   the wireless device sending a request for content to a content provider;
   the wireless device receiving content from the content provider in response to the request, the content including executable code;
   running the executable code on the wireless device to access contextual information by opening a port on the wireless device and accessing the contextual information stored on the wireless device using a context awareness module associated with the native application;
   the wireless device sending the contextual information to a content provider; and
   receiving contextual content in the wireless device from the content provider in response to the contextual information.

2. The method of claim 1, wherein the native application is associated with the content provider.

3. The method of claim 1, wherein opening the port on the wireless device comprises:
   on the wireless device, forwarding an HTTP request to a context awareness application; and
   on the wireless device, opening a web socket between the native application and a web browser, the web socket allowing the transfer of the contextual information from the context awareness application to the web browser.

4. The method of claim 1, wherein the context awareness application continually monitors the port for contextual information.

5. The method of claim 1, further comprising:
receiving additional executable code from the native application; and
running the additional executable code to access the contextual information directly from the native application, where the additional executable code allows interaction with the native application without exchanging scripts with the web property.

6. A wireless device, comprising:
a native application;
a web browser configured to send a request for content and receive the content, the content comprising executable code;
a processor configured to run the executable code;
a context awareness application associated with the native application, wherein running the executable code opens a port against the native application on the wireless device to access contextual information stored on the wireless device;
the web browser configured to send the contextual information to a content provider; and
the wireless device configured to receive contextual content from the content provider in response to the contextual information.

7. The wireless device of claim 6, wherein the native application is associated with the content provider.

8. The wireless device of claim 6, wherein opening the port on the wireless device comprises:
on the wireless device, forwarding an HTTP request to the context awareness application; and
on the wireless device, opening a web socket between the native application and a browser, the web socket allowing the transfer of the contextual information from the context awareness application to the web browser.

9. The wireless device of claim 6, wherein the context awareness application continually monitors the port for contextual information.

10. The wireless device of claim 6, further comprising:
additional executable code associated with the native application; and
the processor running the additional executable code to access the contextual information directly from the native application, where the additional executable code allows interaction with the native application without exchanging scripts with the web property.

11. A non-transitory server readable medium having stored thereon server-executable instructions configured to cause a wireless device to perform operations, comprising:
providing a native application on a wireless device;
the wireless device sending a request for content to a content provider;
the wireless device receiving content from the content provider in response to the request, the content including executable code;
running the executable code on the wireless device to access contextual information by opening a port on the wireless device and accessing the contextual information stored on the wireless device using a context awareness module associated with the native application;
the wireless device sending the contextual information to a content provider; and
receiving contextual content in the wireless device from the content provider in response to the contextual information.

12. The non-transitory medium of claim 11, wherein the native application is associated with the content provider.

13. The non-transitory medium of claim 11, wherein opening the port on the wireless device comprises:
on the wireless device, forwarding an HTTP request to a context awareness application; and
on the wireless device, opening a web socket between the native application and a web browser, the web socket allowing the transfer of the contextual information from the context awareness application to the web browser.

14. The non-transitory medium of claim 11, wherein the context awareness application continually monitors the port for contextual information.

15. The non-transitory medium of claim 11, further comprising:
receiving additional executable code from the native application; and
running the additional executable code to access the contextual information directly from the native application, where the additional executable code allows interaction with the native application without exchanging scripts with the web property.

16. A wireless device, comprising:
a native application;
web browsing means for sending a request for content to a content provider and receiving the content, the content comprising executable code;
processor means for running the executable code;
a context awareness application associated with the native application, wherein running the executable code opens a port against the native application on the wireless device to access the contextual information stored on the wireless device; and
wherein the web browsing means sends the contextual information and receives contextual content from the content provider in response to the contextual information.

17. The wireless device of claim 16, wherein the native application is associated with the content provider.

* * * * *